Feb. 1, 1966  A. FIBISH  3,232,510
FORMING MACHINE
Original Filed Sept. 17, 1959  10 Sheets-Sheet 1
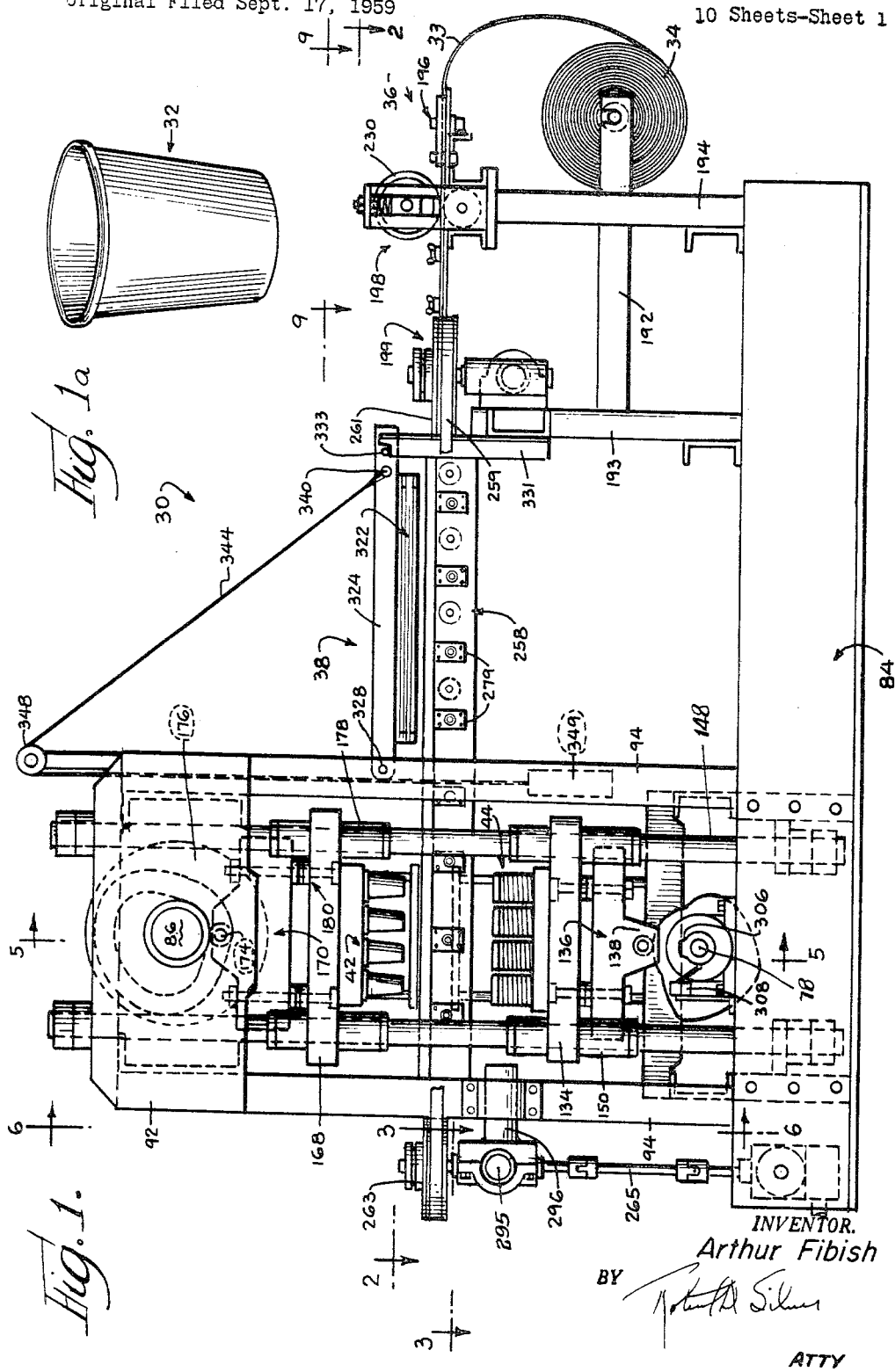
INVENTOR.
Arthur Fibish
BY
ATTY Feb. 1, 1966 A. FIBISH 3,232,510
FORMING MACHINE
Original Filed Sept. 17, 1959 10 Sheets-Sheet 2
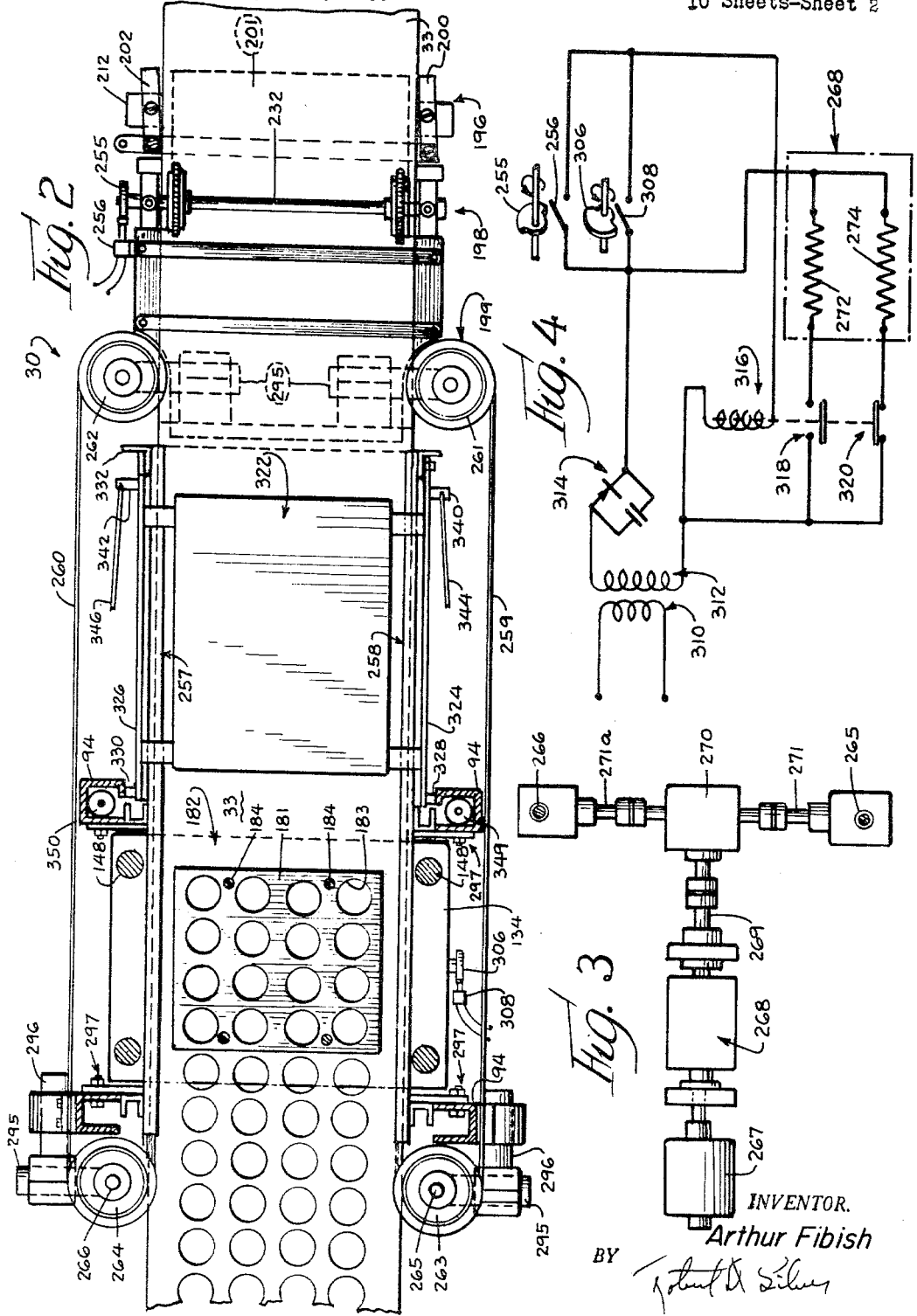
INVENTOR.
Arthur Fibish
BY
ATTY

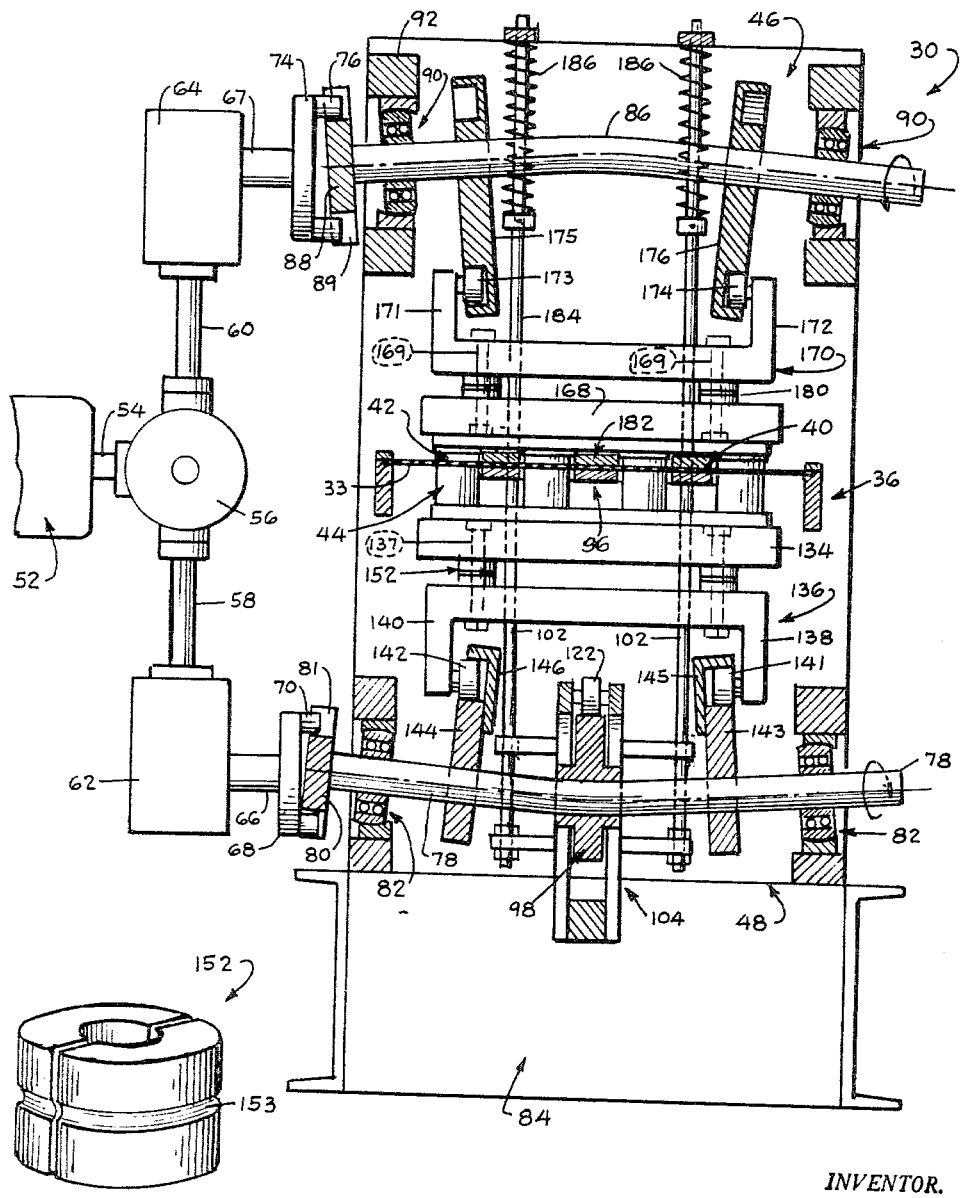

Inventor
Arthur Fibish
By Robert A. Silver
atty

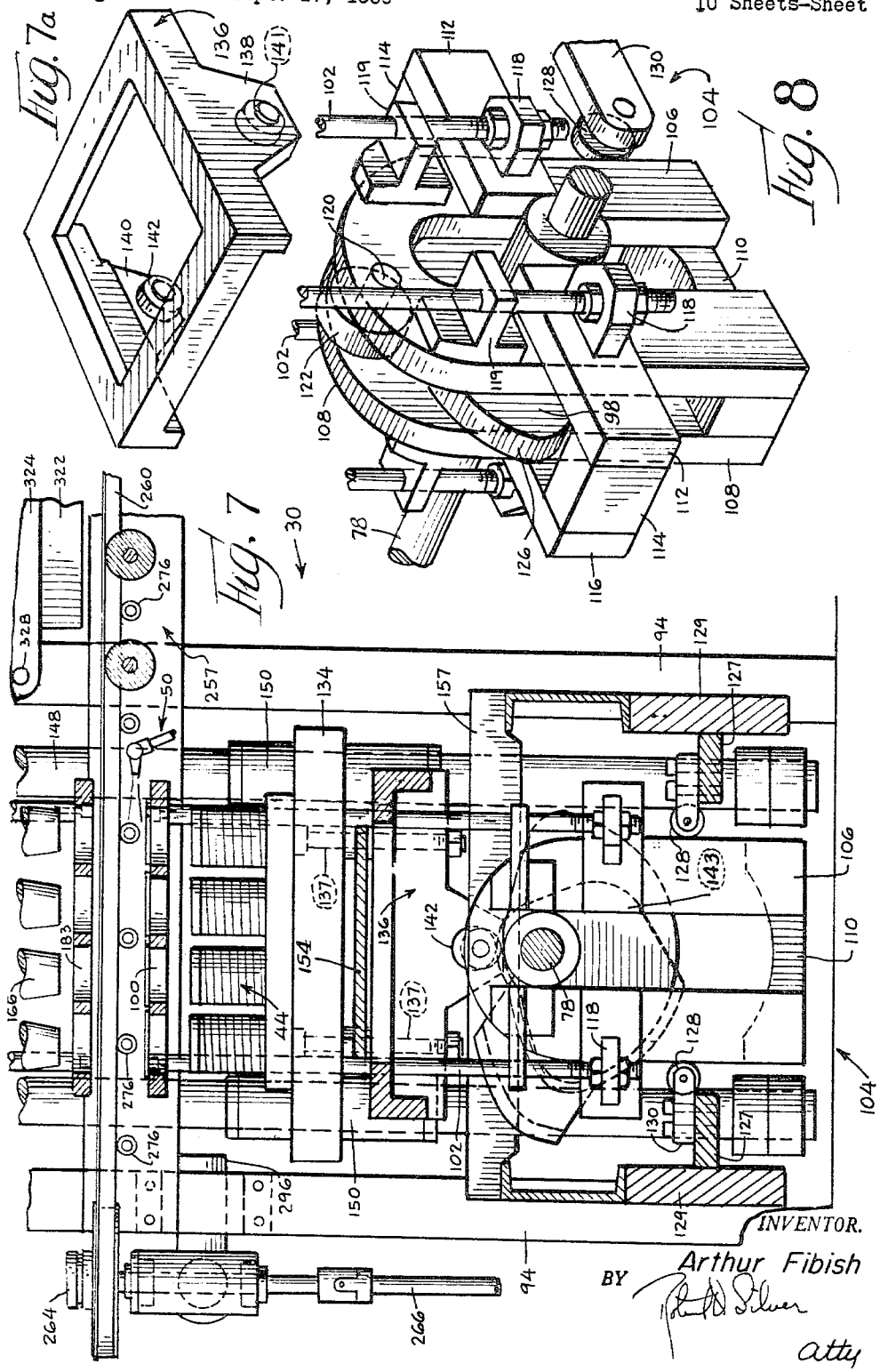

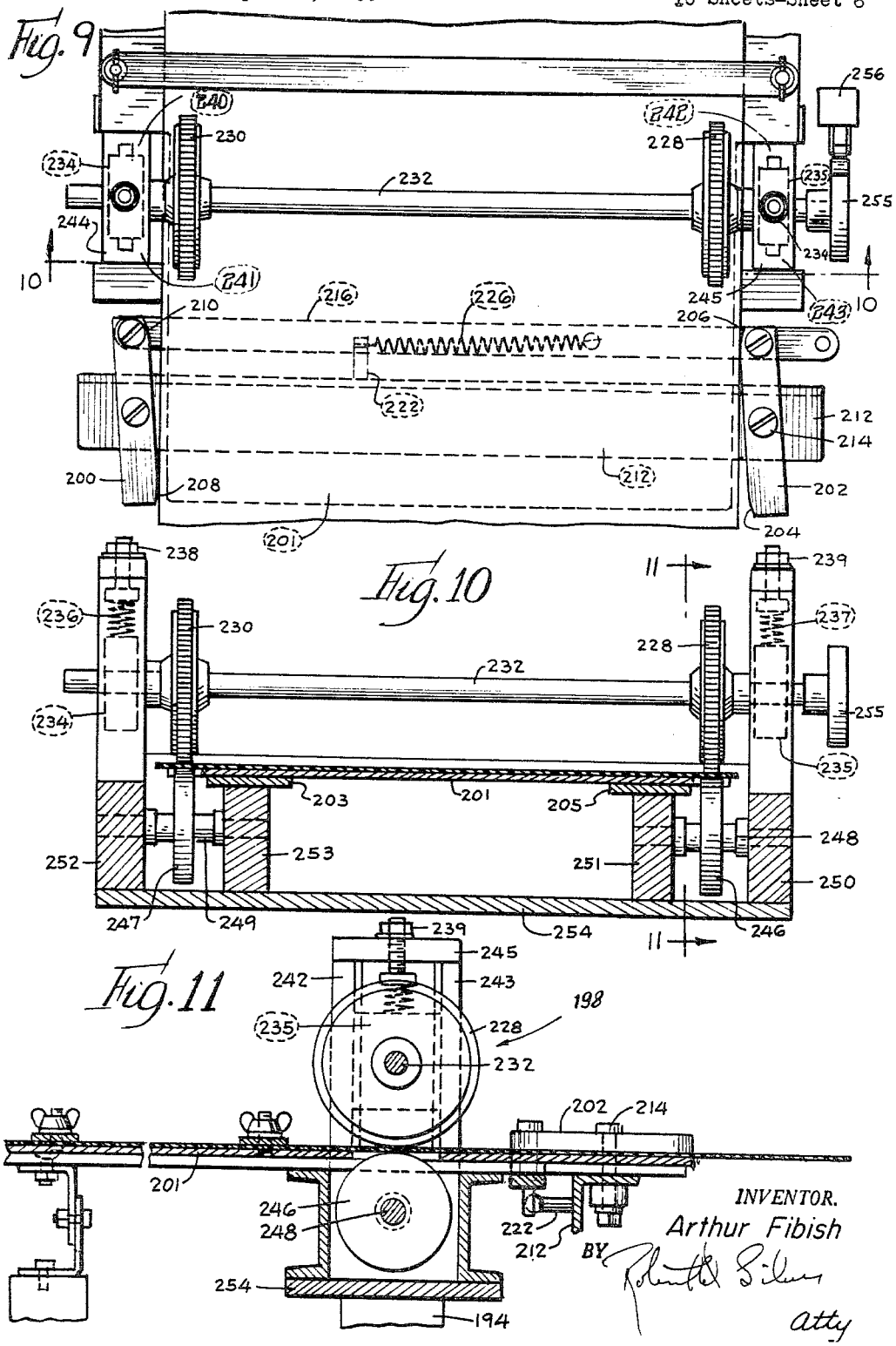

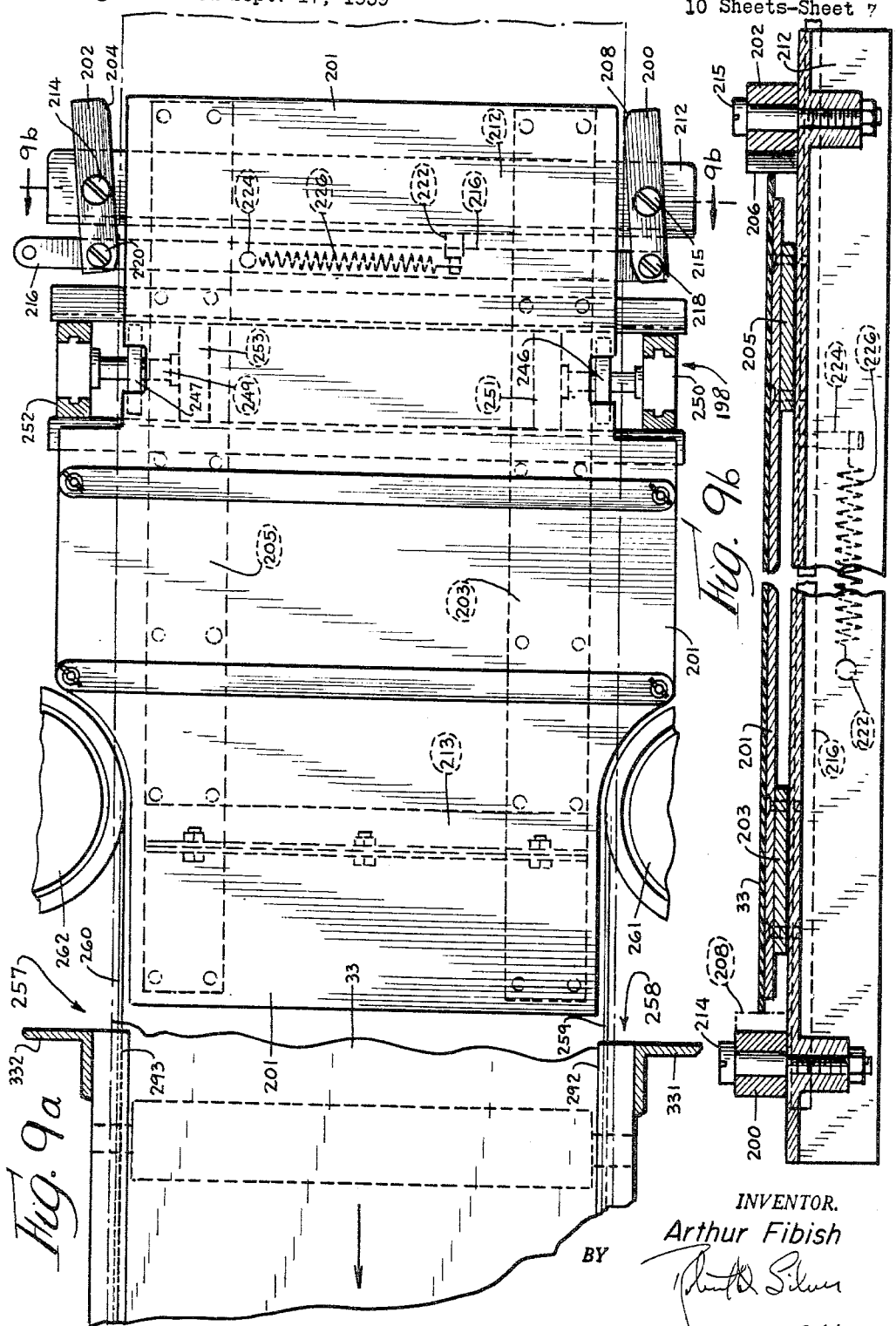

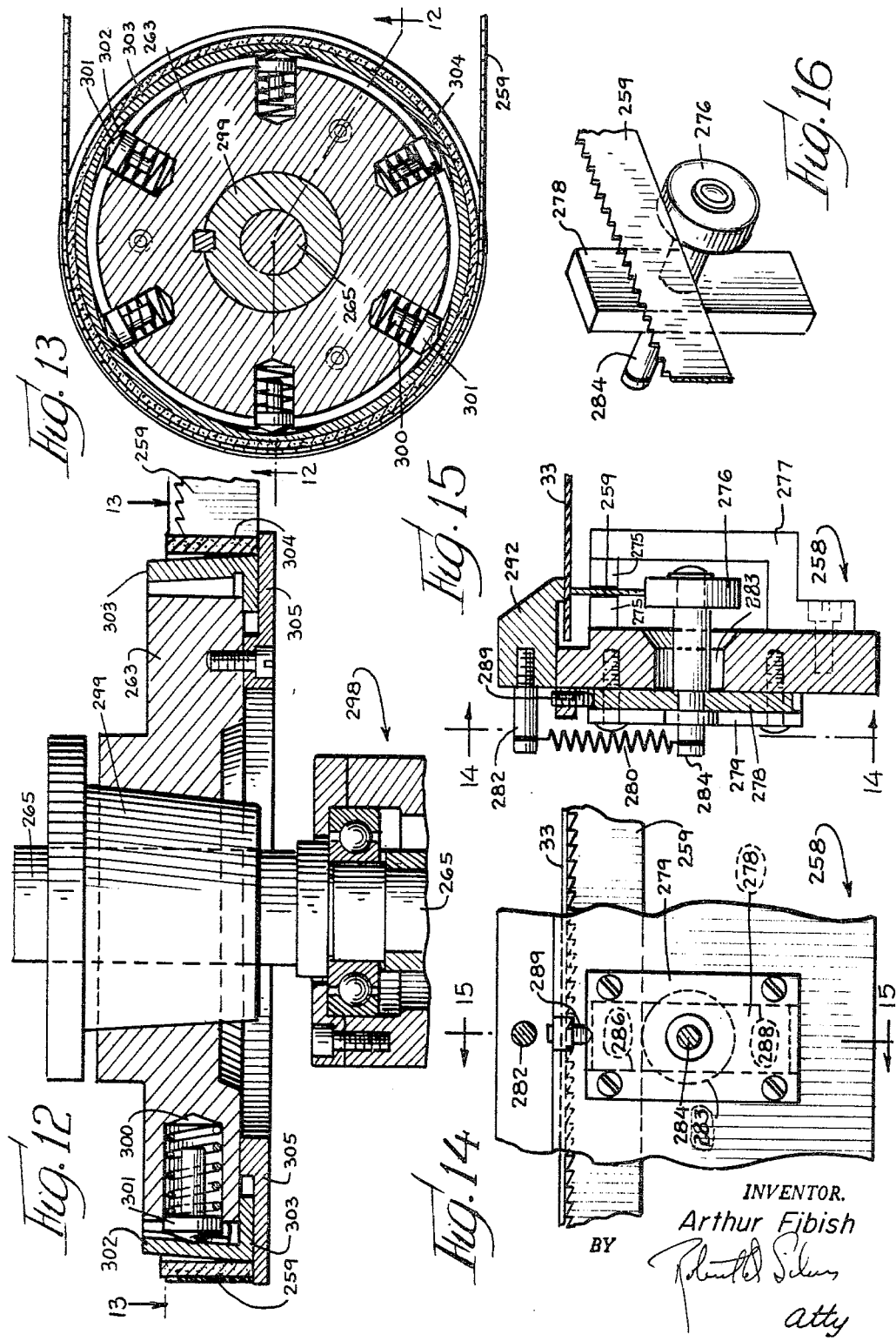

Feb. 1, 1966     A. FIBISH     3,232,510

FORMING MACHINE

Original Filed Sept. 17, 1959     10 Sheets-Sheet 9

INVENTOR.

Arthur Fibish

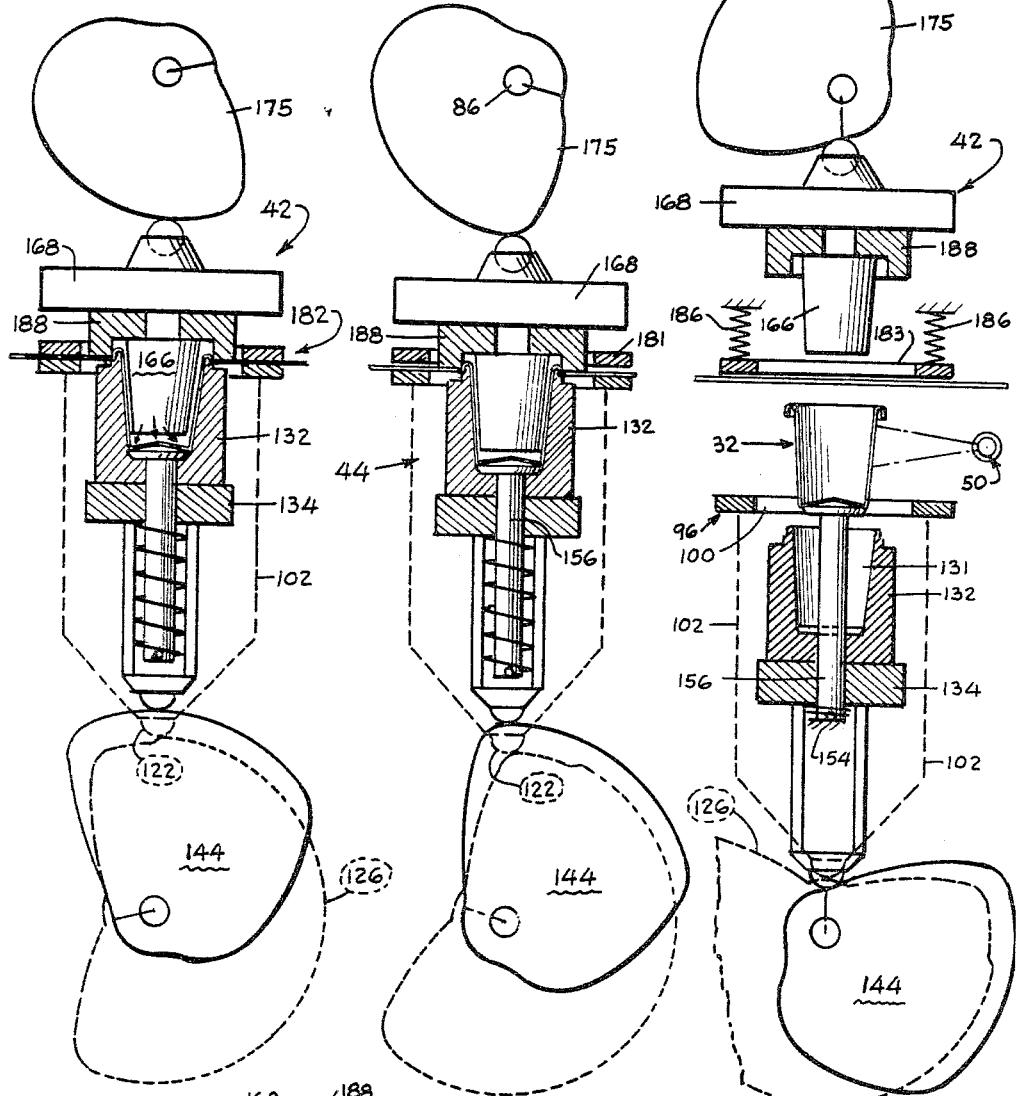
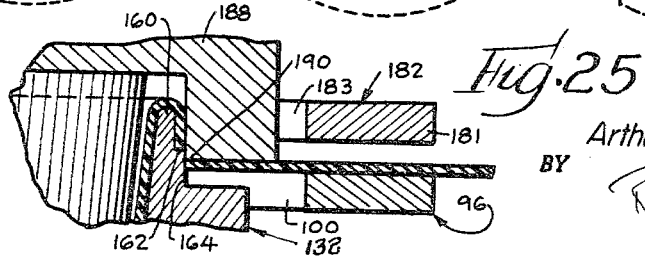

3,232,510
FORMING MACHINE
Arthur Fibish, Mount Prospect, Ill., assignor to Illinois Tool Works Inc., Chicago, Ill., a corporation of Delaware
Original application Sept. 17, 1959, Ser. No. 840,611, now Patent No. 3,105,270. Divided and this application July 29, 1963, Ser. No. 298,190
4 Claims. (Cl. 226—172)

This invention relates generally to an apparatus for forming articles of manufacture out of sheet plastic materials, and more particularly relates to a machine for forming plastic containers of the thin wall variety.

The present invention is a division of copending application Serial No. 840,611, filed September 17, 1959, entitled, Forming Machine, now Patent No. 3,105,270.

In the art of forming containers and the like from plastic materials of the thermoplastic variety, two major methods have been used heretofore, namely, that of injection molding and the second type which may be denominated as pressure molding. In the latter method, a pressure differential is created across a web or membrane of thermoplastic material to cause it to move into engagement with the mold member. The apparatus to be discussed hereinafter in greater detail generally relates to the second type of molding process and the preferred apparatus employs the combination using a pressure differential along with a mechanical drawing of the sheet material to obtain the desired results.

While containers may be formed by a blow molding or vacuum molding process without any mechanical engagement of the web of heated thermoplastic material to form the container, it has been found that more uniform results are obtained by mechanically drawing the heated thermoplastic material with a mandrel to cause a major deformation of the web or sheet stock. The web or sheet stock is first engaged by a clamp means, the mandrel then engages and draws the thermoplastic material, the thermoplastic material is then blown or drawn into contact with a surrounding chilled mold cavity by a fluid pressure differential (preferably air pressure differential) which causes the separation of the thermoplastic material from the mandrel and engagement with the cooled mold cavity. The next step in the operation is to sever the drawn and formed thermoplastic product from the remaining web or sheet stock and finally to eject the finished item from the mold.

Prior art types of machines of types known to me which are adapted to practice the aforedescribed general method of manufacture have had certain major deficiencies. For example, one problem of the prior art machines was that the wear of the major cam bearings and of the cams per se in the machine was excessive. Another problem encountered was that the machine would have a tendency for certain expensive machined parts to break unless extreme care was exercised, such breakage occurring upon initial warmup of the machine before it was in condition for continuous production. The prior art machines also had a high amount of vibrational pounding on each cycle of the machine due to the construction thereof.

A further prior art problem frequently encountered was the inaccuracy of the feeding mechanism of the machines which caused a much higher amount of scrap than was necessary, said extra scrap including a high number of malformed products, such as containers. These malformed containers were often produced by engagement of the mold with a portion of the web or sheet material which had been previously acted on by the mold. Further, the misalignment of the web of material in the horizontal plane would cause jam-ups and other problems.

A still further problem encountered in prior art devices was that upon occurrence of a jam-up or pile up of the web of material in the machine, the mechanism for heating the thermoplastic material to the required temperature for molding would either cause the plastic material to catch fire, or in the alternative cause the plastic to be heated to a point where it would at least melt and run down onto other parts of the machinery necessitating a complete shutdown while the "mess" was cleaned up.

In order to produce products, such as containers, of the type contemplated herein competitively out of plastic materials, it is necessary that a high operational rate of speed of the machinery be effectuated. The prior art machines have had certain inherent deficiencies such as poor mass in motion relationship, poor feeding mechanisms, etc., which make it impossible for the speed to be changed by any significant factor so as economically to increase production from a single machine. Also the known prior art machinery was not well adapted to adjust to varying thicknesses in material or varying sizes of material. This posed major problems in feeding and molding operations whenever a slight change was encountered in the sheet stock.

It is a general object of this invention to provide an apparatus which overcomes the aforenoted problems.

It is another object of this invention to provide an apparatus which has a construction affording an operation which "cushions" the cycling opposed movement of the mandrel and mold means to provide a somewhat "resilient" action which results in less vibration of the machine, operation at a much lower noise level, and a considerably longer machine life; all without sacrifice of desired functions.

More particularly, it is an object of this invention to provide apparatus for the manufacture of thin wall products of plastic material which has a construction which will accommodate jam-ups or pile ups of containers in the mold cavity area without causing breakage of the apparatus and without necessitating a complete shutdown of the apparatus.

It is a further object of this invention to provide a machine wherein the mandrel or male mold member is separately and positively driven by a drive shaft separate from the shaft driving the female mold member thereby affording a machine which may be operated at a considerably faster speed.

It is further an object of this invention to provide an apparatus of the aforedescribed general characteristics which includes a driven movable clamp member which is actuated separately and apart from the male and female mold means which in turn permits increase in the operational speed of the apparatus, as will be shown hereinafter.

It is a further object of this invention to provide apparatus of the aforenoted general type which includes feed mechanism for accurate feeding (including stopping and starting) of the web material of varying thicknesses and widths.

It is a further object of this invention to provide apparatus of the abovedescribed nature which includes a safety feature construction effecting quick removal of the heater apparatus from association with the web of material whereby the aforementioned fires and gum-ups of the machine are eliminated during unforeseen stoppages of the machine.

It is a further object of this invention to provide a production machine which has a high volume production capacity and which may be quickly converted to the manufacturing requirements for varying converted to the manufacturing requirements for varying types of products of varying contours and dimensions, the convertibility of the machine greatly enhancing the economic usefulness thereof.

It is therefore generally an object of this invention to provide an apparatus of the aforementioned type which has lower maintenance cost, is trouble-free in operation, has an exceedingly high volume production capacity, has a positive but cushioned action, and includes other features as will be set forth which adapt it for the purpose for which it was designed.

The novel features that are characteristic of the invention are set forth with particularity in the claims. The invention itself, however, both as to its organization and its mode of operation, together with additional objects and advantages thereof, will best be understood by the following description of a specific embodiment when read in connection with accompanying drawings in which:

FIG. 1 is a side elevational view of an apparatus embodying my invention;

FIG. 1a is a semidiagrammatic view of one article of manufacture that may be produced by the apparatus shown in FIG. 1;

FIG. 2 is a sectional view along line 2—2 of FIG. 1;

FIG. 3 is a sectional view along line 3—3 of FIG. 1;

FIG. 4 is a semidiagrammatic view of a portion of electrical circuitry for the feed apparatus for the machine shown in FIGS. 1–3 inclusive;

FIG. 5 is a semidiagrammatic sectional view of the apparatus taken along line 5—5 of FIG. 1, said view having certain dimensional relationships greatly exaggerated for purposes of illustrative clarity;

FIG. 5a is an isometric fragmentary perspective view of the adjustment means used in the machine illustrated;

FIG. 7 is a fragmentary view along line 7—7 in FIG. 6;

FIG. 7a is a fragmentary perspective view of a portion of the device shown in FIG. 7;

FIG. 8 is an isometric perspective view of another portion of the apparatus illustrated in FIG. 7;

FIG. 9 is a view taken along line 9—9 of FIG. 1;

FIG. 9a is a view similar to FIG. 9 with certain components removed;

FIG. 9b is a cross-sectional view along lines 9b—9b of FIG. 9a;

FIG. 10 is a view along line 10—10 of FIG. 9;

FIG. 11 is a view along line 11—11 of FIG. 10;

FIG. 12 is an enlarged view along line 12—12 of FIG. 13;

FIG. 13 is a view taken along line 13—13 of FIG. 12;

FIG. 14 is an enlarged fragmentary detailed elevational view of a portion of the feed mechanism taken along line 14—14 of FIG. 15;

FIG. 15 is a view along line 15—15 of FIG. 14;

FIG. 16 is a fragmentary isometric perspective view of the parts shown in FIGS. 14 and 15;

FIGS. 17–20 are semidiagrammatic views of the rotational movements of the cams and the sequential relative movement of the parts of the apparatus shown in the foregoing figures;

FIG. 21 is an enlarged fragmentary sectional view of a portion of the apparatus shown in FIG. 20;

FIGS. 22–24 are semidiagrammatic views similar to FIGS. 17–20 showing the next succeeding positions of the various components during the cycling of the device; and FIG. 25 is an enlarged fragmentary view of a portion of FIG. 23.

Figure 6:
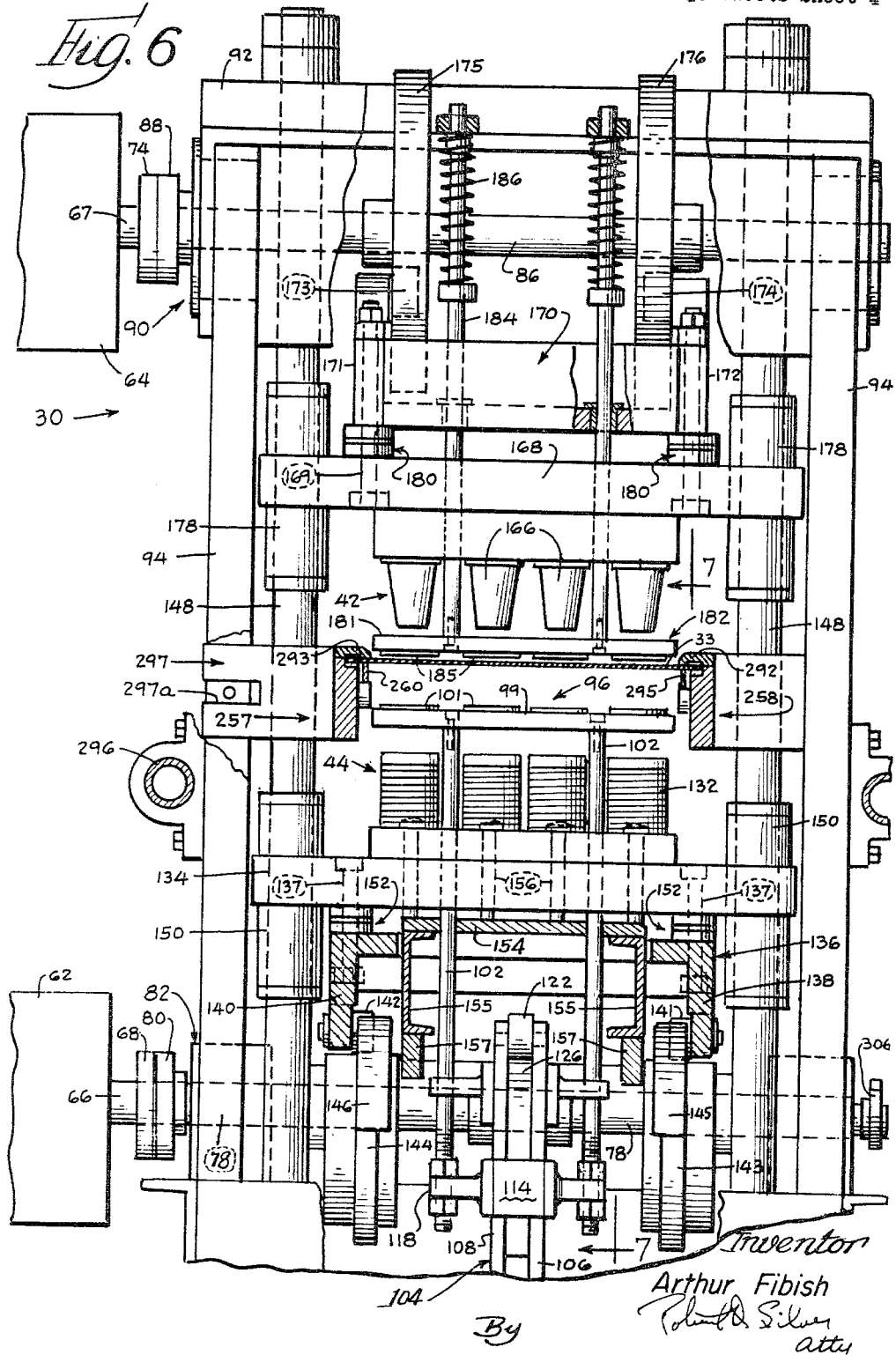
FIG. 6 is an elevational view along line 6—6 in FIG. 1.

Returning now to FIG. 1 of the drawings, the invention relates to a machine 30 which is designed to manufacture thin wall products from sheet stock of plastic material 33, one such product being a thin wall cup or container 32, as shown semidiagrammatically in FIG. 1a of the drawings. While this specification will discuss the machine 30 in terms of manufacture of the cups as shown, the term should not be considered limiting as the invention has wide application to the manufacture of plastic articles of many sizes, shapes, natures and uses.

Before describing the apparatus in detail, it will perhaps be helpful to discuss the major components of the machine and the manner in which functions. The machine 30 is designed to receive a web of suitable thermoplastic material 33, for example, polystyrene, from a suitable supply roll 34, said web 33 being fed into the machine 30 by suitable feed means 36. The feed means accurately and intermittently supplies the web 33 to the machine past temperature controlling means 38 which assures that the web of the material is at the correct temperature for the subsequent molding operations within the machine 30.

As perhaps best shown in semidiagrammatic views such as FIGS. 5 and 17–25, the feed means delivers the material for engagement by the clamp means 40 which firmly fixes same in a precise location so that the male mandrel means 42 may mechanically draw the material to a predetermined position whereupon an air pressure differential is impressed across the web causing the material to be brought into engagement with the mold means 44 to form the desired shape of the container. The formed item is then severed from the web and ejected from the machine by suitable means, the web material that is remaining continuing on through the machine to a scrap salvaging operation for regeneration into sheet material for re-circulation through the machine.

As is perhaps best shown in the semidiagrammatic view of FIG. 5, the mandrel means 42 are actuated by an actuating means 46 and the mold means 44 are actuated by a different and completely separate actuating means 48, both the mold and mandrel means being movable in a prescribed sequential relation to accomplish the foregoing. Now to a more detailed description of the machine 30 and its operation.

A motor 52 (shown in FIG. 5) is connected to a source of power (not shown) and supplies the rotative movement for the heavy parts of the machine. The motor 52 is provided with an output shaft 54 leading to a miter gear unit 56 which has a first output shaft 58 and a second output shaft 60 which are in a one to one ratio with input shaft 54. Shafts 58 and 60 are respectively connected to lower and upper worm gear units 62 and 64, respectively having right-angle output shafts 66 and 67 which may be rotated on the order of 30 to 1 step down ratio relative to input. The first or lower output shaft 66 is adapted to drive the lower actuating means 48 and has a force transmitting connection or driving member 68 mounted on the end thereof and having axially projected lugs 70 on its face. The upper output shaft 67 is similarly formed with an end mounted driving connection member 74 having similar axially projecting lugs 76 on the face thereof.

The lower shaft 66 together with the force transmitting connecting member 68 is adapted to drive a lower cam shaft 78 through a mating driven member 80 having slots 81 therein which are coactable with and driven by the axial lugs 70 on member 68. It will be noted that the lugs 70 of member 68 project into the slots 81 in the member 80 so as to provide a positive rotational driving connection while affording an accommodation to axial movement of the shaft 78 (or relative wobbling of the members 68 and 80) without adversely affecting the connection. The lower cam shaft 78 is rotatably mounted in space spheroidal self-aligning bearing means 82 which are suitably mounted near the opposite ends of the shaft on a base 84.

The upper cam shaft 86 is in the same manner described re member 78 rotatably mounted in bearing means 90 for movement when driven by the upper output shaft 67 through the force transmitting driving connection 74 which engages a driven member 88 having similar slots 89 receiving lugs 76 and affixed to the end of the shaft 86. It will be noted that the upper bearing means 90 are mounted on a crown 92 spaced from the base member by a plurality of suitable upright spacer members 94 as shown in FIG. 1 and FIG. 6 of the drawings.

As will be noted from FIG. 5 of the drawings, the driving and driven connection means and the bearing means of the respective lower and upper cam shafts 78 and 86 are of a configuration which assures that they will easily accommodate a rather large deflection of the center of the cam shafts. This deflection feature not only cushions the vibrations but permits substantial jam-ups of material in the molding parts of the machine (as shall later be explained) without impairing either the driving connection between members 74 and 88 and members 68 and 80 and without seriously affecting the amount of wear on the bearings 82 and 90. Further, breakage of expensive parts is substantially reduced. These features have been found in practice to be significantly important. While in FIG. 5, the shafts 78 and 86 have been shown with an exceedingly large deflection, this has been exaggerated solely for purposes of illustration rather than to show the actual amount of deflection occurring.

Cam shaft 78 (the lower cam shaft as viewed in FIGS. 1, 5 and 6 of the drawings) is operable to drive the mold means 44 and the lower clamp means 96, each being independently driven by a separate cam means. A centrally located cam means 98 is mounted on lower cam shaft 78 and is operable to drive the movable lower clamp means 96 of the machine which is located near the middle thereof. The lower clamp means 96 comprises a clamping plate 99 that directly engages the underside of the material 33 and is formed with a plurality of apertures 100 each having a raised margin 101. The clamp plate 99 is moved up and down to cause the raised margins 101 to come into and out of engagement of the material 33. Such movement is effected by four spaced push rods 102 which are mounted to plate 99 at one end and are mounted to a carriage or yoke 104 at the other end by suitable nuts threaded onto the ends thereof as shown in FIG. 8. The carriage or yoke 104 surrounds the cam means 98 and comprises a pair of spaced horseshoe-shaped plates 106 and 108 which are fixedly mounted together at the bottom of the yoke by a suitable spacer member 110 which connects the bottom legs of the plates. Intermediate the ends of plates 106 and 108 are horizontally outwardly extending pairs of struts 112 and 116 which are connected together at their extremities by a pair of spacer members 114 as shown. Each of the horizontally extending struts 112 and 114 is formed with transversely extending lugs 118 which are adapted to engage and mount the four push rods 102, said rods also extending through spaced supports 119 which are mounted above the lugs 118 on plates 106 and 108.

The carriage or yoke 104 is moved upwardly and downwardly in accordance with the rotational movement of shaft 78 by a cam follower roller 122 which is rotatably mounted on a shaft 120 and which is located near the top of and journalled to the two horseshoe-shaped plates 106 and 108. The cam roller 122 follows the outer surface 126 of cam means 98, as well understood in the art. The general shape of the cam surface 126 is perhaps best shown semidiagrammatically in FIGS. 17-24 for purposes to be explained hereinafter. The carriage or yoke 104 is guided in its upward and downward movement by suitable rollers 128 which are located at each of the four corners of the carriage for coaction with the edges of the legs of plates 106 and 108. As shown in FIG. 7, the rollers 128 are rotatably mounted in fixed position to horizontally extending members 130 which in turn are fixed to lugs 127 of cross members 129 which extend between and are fixed to frame uprights 94.

The mold means 44 is also actuated by the lower cam shaft 78 and comprises a plurality of individual frustoconical depressions or mold cavities 131 (FIGS. 17-19) formed in mold members 132 (see also FIG. 6) which may be suitably mounted on a large platen or bolster 134. A hollow cradle 136 having depending legs 138 and 140 is shown in perspective in FIG. 7a. As shown in FIG. 7, the cradle 136 depends from and is mounted to platen 134 through spacers 152 (FIGS. 5 and 6, as will be discussed later) by elongated spaced bolts 137. Rotatably mounted near the bottom of each of the two cradle legs 138, 140 is a pair of cam rollers 141, 142. The rollers 141 and 142 coact with spaced identical cams 143, 144 (FIGS. 5-7, 17-20 and 22-24) mounted on shaft 78 for rotation therewith. The cams 143, 144 have cam flanges 145, 146 associated therewith to assure positive engagement of the rollers 141, 142 with the cams 143, 144 during the opening sequences of the operation to pull down the mold as will become apparent. It will also be apparent that the surface configuration of the cams 143, 144 is substantially as shown in FIGS. 17-24 to afford a sequential operation as shall be later explained.

A plurality of upright cylindrical guide posts 148 preferably four in number, is located within the confines of the machine as defined by the four upright members 94 and serve as precision guide rods for the movement of the mold means 44 and also for the mandrel means 42 which is spaced thereabove. Suitable ball bearing guide sliding members 150 are associated with the corners of the mold means bolster 134 and with the guide rods 148 to assure easy sliding movement thereof in a vertical plane in timed relation to the rotational movement of the cams 143, 144.

It is important that there be an adjustment means between the cradle 136 and the platen 134, and to this end suitable adjustable spacer members 152 (see FIG. 5a) are inserted in the space therebetween in surrounding relation to the four bolts 137. Proper location of this adjustment means 152 assures a quick, easy changeover of the machine to accommodate it to varying thickness of materials as well as to accommodate different mold configurations. I have found that one very acceptable expedient for adjustment means is a split ring mechanism which is held in place by an annular spring (not shown) mountable in the central annular groove 153 formed in the outer side walls of the split ring. The split ring mechanism when used with shims assures accurate adjustment of the height of the platen 134 to the cradle 136 for the desired tolerance.

Referring now to FIGS. 6 and 7, a fixed plate 154 is shown mounted within the hollow lower cradle 136 and is fixed to a pair of spaced short channels 155, said plate 154 being generally horizontally aligned for coaction with the ends of mold knock out plugs 156. The channels 155 in turn are mounted on cross members 157 which in turn are mounted to the frame. (It should be noted that channels 155 are not shown in FIG. 7 for purposes of clarity.) The plate 154 is formed with suitable apertures therein for the push rods 102 so that the latter may move relative to the fixed plate 154. It is apparent that the arms 138, 140 of the cradle mechanism surround the plate 154 and are relatively movable thereto so that the mold means 44 moves relative to the plate 154 thus under certain conditions to cause movement of the mold relative to the mold plugs 156 which bottom on said plate. The plugs 156 per se are each formed with an enlarged head which forms the bottom of the mold cavity 131. As will be explained, the head of the knock out plug ejects or knocks out the finished molded item from the confines of the mold cavity 131.

The individual molds 132 each have a lip portion 160 (see especially FIGS. 21 and 25) which is annular in configuration and extends upwardly, the outer edge of portion 160 being formed with a pair of axially (vertically) spaced shoulders 162 and 164. These shoulders 162 and 164 serve clampingly to engage and also to sever the web material 33 when coacting with the mandrel means 42 during the forming operation as will become apparent from the descriptions following hereinafter. This structure and the operation thereof form the basis of the copending application of Bryant Edwards having Serial No. 763,668, now abandoned, and assigned to the assignee of the instant invention.

The mandrel means 42 is spaced above the sheet 33 and essentially comprises a plurality of plugs or mandrels 166 which are telescopically movable within the mold cavity 131. The individual plugs or mandrels 166 are mounted on a ram or upper platen 168 which, through four bolts 169 (FIGS. 5 and 6) is spacedly mounted to an upper cradle 170 having spaced cradle arms 171, 172 similar to the arms of cradle 136 used in the lower portion of the machine. A pair of rollers 173, 174 is mounted on the upper ends of the cradle arms 171, 172 for coaction with a pair of spaced cam track members 175, 176 fixedly mounted to the upper cam shaft 86. It will be observed that cam shaft 86 rotates in a direction opposite to the direction of rotation of cam shaft 78. The upper platen or ram 168 is mounted at its corners for sliding up and down movement on suitable slide members 178 which are similar to and spaced above slide members 150. The slides 178 also ride on upright guide rods 148. Four spaced adjustment means 180, similar to adjustment means 152 described hereinbefore, are provided for the upper portion of the mechanism intermediate the platen 168 and cradle 170 to accomplish adjustment to variable positions of the mandrel members to afford a quick, yet easy and accurate method of adjustment for variable thicknesses of materials and/or for manufacturing items of different overall height.

The upper clamp means 182 is relatively fixed and is cooperable with the lower clamp means 96 and comprises a plate 181 having apertures 183 with downwardly projecting margins 185 oppositely positioned to margins 101 on plate 99. The plate 181 is fixedly mounted to the crown 92 by means of a plurality of rods 184, the latter having a very short lost motion spring loading arrangement 186 whereby the clamp means 182 is biased in a downwardly direction and may have a quarter-inch or so lost-motion movement in an upwardly direction upon clamping engagement with the material 33 together with the lower clamp means 96. It will be realized that the apertures 183 in the upper clamp means 182 are respectively aligned with the apertures 100 in the lower clamp means and that each of the apertures 100, 183 is slightly larger than the mold and mandrel means as shown in FIGS. 17-25.

Surrounding the individual mandrels 166 at the upper ends thereof are slightly larger annular members 188 (FIGS. 17-25) each having a central depression 189 which defines a leading clamping and cutoff edge 190 which is adapted to trap the web of material between the upper lip portion 160 and shoulders 162 and 164 of the mold means as shown in enlarged views of FIGS. 21 and 25. Also, the mandrels 166 have air pressure means associated therewith (not shown) so as to admit air under pressure to one side of the material during a portion of the forming cycle. The structure and function of the parts referred to are also a part of the said copending application in the name of Bryant Edwards previously referred to. The sequence of the operation of the various components described hereinbefore will be set forth in more particularity after describing the apparatus for feeding the material through the device.

The feed mechanism 36 for the material is separately actuated, though coordinated in timed relation, with the movements of the mold and mandrel means 44, 42. As noted heretofore, the material or web 33 may be stored at the front end of the machine on a suitable storage roll 34 which is mounted to the ends of a pair of cross-frame members 192. Frame members 192 are fixed to horizontally spaced upright frame members 193 and 194. It is sometimes desirable and possible, to run the material 33 directly into the feed mechanism from the output end of an extruder mechanism (not shown). Speaking broadly, as the material leaves the extruder, or in the alternative the storage roll 34, it first proceeds through alignment means 196, then through measuring and control means 198 for engagement by a moving clamp means 199 which physically moves the material through the apparatus. The alignment means 196 assures the material 33 being fed into the machine in accurate alignment for subsequent engagement by the moving clamp mechanism 199, and also assures accurate measurement by the measuring and control means 198.

The alignment means 196 comprises a type of apparatus roughly pantograph in nature which is shown in FIGS. 9-11. As shown, the alignment means 196 comprises a pair of short spaced apart web engaging members 200 and 202 aligned transversely of the web and having rounded leading and trailing edges 204, 206 and 208, 210 respectively which are located on and project above opposite sides of an elongated transverse, horizontal, smooth, entry plate member 201. An angle member 212 extends transversely across the front of the machine and serves pivotally to mount each of the two web engaging members 200 and 202 by pivots 214 and 215. The angle member 212 also serves, along with transverse member 213 to support a pair of thin longitudinally running spaced support members 203, 205 which support the entry plate 201. It should be noted that the pivots 214, 215, on opposite sides of the machine, are spaced apart a distance greater than the width of the material contemplated to be fed into the machine. The members 200 and 202 are physically tied together by a transverse spacer member 216 which is pivotally mounted to the trailing edges of members 200, 202 at 218 and 220 so that the two members 200, 202 will move in tandem operation and will always present parallel surfaces for contact with the edge of the sheet material 33 passing through the apparatus. The spacer member 216 is biased to the left as viewed in FIGS. 9 and 9b by means of a spring 226 which is attached at one end to member 212 by a pin 222 at the other end and to a pin 224 on member 216. Thus, the web engaging members 200 and 202 will normally present curved edges 206 and 208 to the opposite edges of the sheet material strip or panel 33, said edges always being parallel and self adjusting and aligning so that the material 33 is always accurately centered as it is fed into the machine.

The measuring and control means 198 is mounted at the top of uprights 194 and is spaced to the left of the alignment means 196 as viewed in FIGS. 1 and 9a. It will be noted that in FIG. 9a the upper portion of means 198, above plates 201, is removed for purposes of clarity. The measuring and central means 198 comprises a pair of spaced, knurled-edge top wheels 228 and 230, best seen in FIGS. 9, 10 and 11, which wheels are adapted to rest upon and engage the top surface of the web of material 33, as it is received from the alignment means 196. The knurled wheels are spacedly mounted and keyed upon a shaft 232 which is rotatably mounted at its opposite ends in movable bearing blocks 234 and 235. The bearing blocks 234, 235 are loaded by suitable spring mechanisms 236, 237 which are adjustable by a nut and bolt arrangement 238, 239 as shown in FIG. 10. The bearing blocks 234, 235 slide respectively between pairs of spaced apart track members 240, 241 and 242, 243 which are joined together at their tops by spacer bars 244, 245. It will be noted that the spacer bars 244, 245 serve to mount the nut and bolt adjusting means 238, 239 for loading the blocks 234, 235 as previously discussed, so that the wheels 228 and 230 may accommodate flaws in the material without binding, as well as adjusting to varying thicknesses of material.

As shown in FIGS. 9a, 10 and 11, a pair of rotatable lower wheels 246 and 247, which may be smooth surfaced is mounted on axially aligned but spaced shafts 248, 249 which in turn are mounted in bearing blocks 250, 251 and 252, 253. This entire mechanism is fastened to transverse cross member 254 which in turn is fastened to uprights 194. The wheels 246, 247 are disposed in opposed relationship to top wheels 228 and 230, said wheels 246 and 248 projecting a very slight distance above the major plane of plate 201 through appropriate notches therein (see FIG. 9a). It will be observed that the arrangement is such that as the material 33 is pulled through the machine all four of the wheels will rotate, the top wheels 228 and 230 causing shaft 232 to rotate due to the frictional contact of the knurled surfaces of the wheels with the material.

Shaft 232 is formed with an extension thereon which is located to the right as viewed in FIG. 9 so that as shaft 232 turns it causes a cam 255 located at the end of the extension to rotate therewith. The cam 255 in turn is operable to actuate a switch 256 each time it makes one complete revolution. The function of switch 256 is to stop the moving clamp means 199 (FIGS. 1 and 2 as immediately hereinafter) in accurate relationship to the linear movement of material 33 as it is fed into the machine. The switch 256 operates in the circuit shown in FIG. 4 which is discussed in detail hereinafter. The moving clamp mechanism 199 previously referred to forms a part of the feed means 36 for moving the material 33 through the machine. It extends from adjacent the measuring and control means 198 to the output side of the machine and comprises track means 257, 258 spaced on opposite sides of the moving web. Disposed within the track means 257, 258 for cooperation therewith are a pair of spaced driving members 259, 260, here shown in the form of endless toothed band saw blades which directly engage the material 33 to accomplish positive movement of same through the machine. While it will be apparent that any of a number of suitable toothed mechanisms may be used to engage the underside of the web of the material to move it along, it has been found particularly expeditious to use band saw blade members because they are easy to obtain, are available to rather accurate dimensions, and are relatively inexpensive. The band saw blades 259, 260 are mounted for movement over idler wheels 261, 262 which in turn are mounted on uprights 193 and on driving wheel members 263, 264 which are mounted on uprights 94 at the outlet side of the machine and spaced from the idler wheels. The idler wheels 261, 262 are located adjacent the relatively smaller trailing end of entering plate 201 as shown in FIG. 9a. The driving members 263, 264 will be discussed in detail later and are driven by suitable spaced upright drive shafts 265, 266 which, in turn, are driven by a constant speed D.C. motor 267 (FIG. 3) which constantly runs when the machine is in operation.

As shown diagrammatically in FIG. 3, a clutch-brake mechanism 268 is disposed intermediate the drive shafts 265, 266 and the motor 267. The output side of the clutch-brake mechanism 268 is attached to a gear unit 270 by a shaft 269. The output side of gear unit 270 comprises a pair of oppositely disposed shafts 271, 271a which lead respectively to the upright drive shafts 265 and 266 which drive wheels 263, 264. The clutch-brake 268 is preferably of the magnetic variety, as well understood in the art and contains therewithin, a pair of electrically energizable coils. The first of these coils 272 (FIG. 4) when energized assures a positive driving connection and the second coil 274 when energized assures positive mechanical braking action so that no rotary motion is transmitted to shaft 269. Thus, by alternatively electrically energizing the coils 272 and 274 in a manner to be later explained, positive action and inaction of the drive wheels and the driving toothed members 259, 260 is accomplished, and the speed and duration of feeding of the sheet or web 33 may be in accurate timed relationship to the motion and sequence of the rest of the operating parts of the machine.

The material 33 is trapped between the smooth overhanging portions 292, 293 of the track means 257, 258 and the teeth of the band saw members 259, 260 (see FIGS. 14, 15 and 16) for sliding movement along portions 292, 293. The individual band saw members 259, 260 are mounted for engagement with the web of material 33 at the edges thereof by a plurality of rollers 276 which are spacedly and rotatably mounted on shafts 284. The shafts 284 are mounted in sliding block members 278 which are slidably mounted in grooved track members 279. Mounted on the exterior of the tracks 257, 258 to prevent the band saw blades from slipping off rollers 276 are spaced blocks 275 which are mounted at suitable intervals on the tracks 257, 258, the inner block being mounted on the track and the outer block being mounted on a bracket member 277 as shown in FIG. 15. The blocks 275 are preferredly made of a hard material such as tungsten carbide. The shafts 284 extend through relatively large holes 283 formed in the tracks and are mounted therein by springs 280 which are attached to the ends of shafts 284 and to pins 282 mounted on members 292, 293. Each spring 280 causes the corresponding member 278, and hence roller 276, and thereby members 259, 260 to be biased upwardly to a fixed position so determined as to assure positive engagement with the underside of the web of the material 33. Slide member 278 slides upwardly within grooves 286 and 288 of member 279 until it engages a set screw 289 which limits the upward extent of the movement of the slide member 278 and hence of roller and band saw members 259, 260. It will be noted that the band saw members 259, 260 are free to move downwardly against the bias of springs 280. The set screws 289 assure that the teeth of the band saw members 259, 260 can be set to a correct height for positive material engagement without tending to bite too aggressively or to saw through the plastic sheet material web 33. The tracks 257 and 258 are adjustably mounted on the machine by sliding plates 297 (FIGS. 2 and 6) having elongated slots 297a therein. The plates 297 are fastened to uprights 94 by suitable bolts so that the space between the tracks 257, 258 may be adjusted. The idler wheels 261, 262 are mounted on adjustment rods 295 as are drive wheels 263, 264 so that the space therebetween may be adjusted as desired.

The driving wheels 263, 264 (illustrated in FIGS. 12 and 13) are mounted in suitable bearings 298 for rotation therein. The bearings 298 are in turn mounted on width adjusting rods 295 (FIGS. 1 and 2) and tension adjusting rods 296, the latter being attached to upright members 94. The wheel 263 is mounted on a keyed frusto-conical hub member 299 on shaft 265. The outer periphery of wheel 263 is provided with a plurality of radially extending bores 300 having spring loaded pins 301 mounted therein for engagement with complementary indentations 302 on a shoe member 303 which embraces the periphery of the wheel 263. (The construction of wheel 264 is identical, and wheel 263 has been chosen for illustrative purposes.) The body portion of annular member 303 tapers inwardly upwardly as shown in a manner to cause an annular peripheral liner member 304 of fibrous material such as brake lining mounted on each wheel together with the band saw members 259 to be biased in a downward direction. Thus, this configuration causes the toothed band saw members 259, 260 mounted and moved thereon to be biased against the rollers 276. At the same time, the previously described spring loaded pins 301 provide a constant tension on the band saw members 259, 260 and also provide a friction clutch arrangement in the event that the material 33 becomes jammed in the machine in the mold area. It is important that a constant tension be kept on the members 259, 260 to accomplish the accurate feeding of the precise amount of material as it is desired per cycle of the machine. The L-shaped in cross section member 303 and the brake band fibrous member 304 are both retained on the wheel 263 by a suitable annular retaining plate 305 which may be bolted to the wheel 263 as shown in FIG. 12.

As mentioned hereinbefore, the D.C. motor 267 is preferably running at all times and the feed mechanism driven thereby is intermittently driven by the energization of coil 272 and de-energization of coil 274 of clutch-brake 268. To this end, cam 306 is mounted on the end of lower cam shaft 78 (FIG. 6) and when rotated (see wiring diagram in FIG. 4) closes switch 308 to energize a relay 316 which in turn, de-energizes the brake coil 274 and energizes clutch coil 272 to start the drive wheels 263, 264 turning. It will be noted from FIG. 4 that a transformer input 310 is shown with one side of the output 312 being connected to a full wave rectifier 314, the other side thereof being connected to relay 316 through switches 256 and 308 which are normally open and connected in parallel. A normally open relay switch 318 is in series with the motion transmitting clutch energizing coil 272 of the clutch 268, and a normally closed relay switch 320 is connected in series with the mechanically de-energizing coil 274 in the other relay circuit. Thus, closing either switch 256 or 308 by their respective cams will serve to energize relay 316 to energize coil 272 and de-enerzige coil 274. The actuating surfaces of cams 306 and 255 are so coordinated and timed that first, cam 306 closes switch 308 whereby the drive wheels 263, 264 are turned to cause material 33 to be fed into the machine. This operation causes top wheels 228, 230 of the measuring control means 198, and hence shaft 232 to rotate whereby cam 255 actuates switch 256. At this time the cam 255 associated with measuring mechanism takes over control of the circuit from cam 306 and switch 308, and cam 306 causes switch 308 to open. The circuit governing the movement of the feed mechanism then remains under the control of the switch 256 which shuts off the feed mechanism. In summary, the lower cam shaft 78 is operable to start the feed mechanism in timed relation to the movement of the mold means 44 and mandrel means 42, and the measuring and control means 199, by virtue of cam 255, is operable to stop the feed means at the precise instant when sufficient material 33, as measured by wheels 228, 230, has moved through the device to provide the predetermined amount of stock necessary for one molding cycle.

A heater mechanism 322 is shown semidiagrammatically and is disposed immediately adjacent the mold and mandrel means of the machine. The heater 322 may comprise, for example, a plurality of Nichrome, infra-red elements or other heaters as suitable and desired which are preferably mounted between a pair of spaced longitudinally extending rails 324 and 326. The rails 324, 326 are each pivotally mounted at the machine end thereof as shown at 328 and 330. The other ends of rails 324, 326 are formed with pins 333, 334 (FIG. 1) which rest on spaced uprights 331, 332 when the heater is in the position shown in FIG. 1. The uprights 331, 332 are attached to uprights 193 as shown. Second pins such as 340, 342 are mounted on each side rail 324 and 326 a short distance from pins 333, 334 for attaching one end of the pair of spaced overhead cables 344 and 346, each of which is looped over a pulley 348 and has a weight 349, 350 attached to the other end thereof as shown. The weights are preferred disposed within the channel-shaped uprights 94, and provide, along with the position of the pulley, a counter balance with a mechanical advantage such that they are sufficient to maintain the heater in a balanced upright position when it is so positioned, and yet are insufficient to cause the heater to move of its own accord to this upright or spaced position from the horizontal position shown in FIG. 1 of the drawings. Thus, when a jam-up occurs in the machine such that the web of material 33 is stopped beneath the heater 322, the heater 322 is manually pivotally moved to its spaced or upright position to prevent the material 33 from melting and dropping down to coat under portions of the machine and/or to avert the possibility of the web starting a fire.

*Operation*

Assuming the parts are in the position shown in FIG. 17, and after an initial warm-up period, a cycle of the apparatus can be discussed as follows: The motor 52 is energized by suitable means (not shown) which in turn causes operation and rotation of the upper and lower cam shafts 86 and 78. The upper cam shaft 86 in turn causes movement of the cams 175, 176 which in turn control the movement of the mandrel means 42. The rotation of the lower cam shaft 78 causes rotational movements of cams 143, 144 (and accompanying cam flanges 145, 146) cam 98 and cam 306. Cam 306 is located on the end of the shaft and controls the switch 308 for the intermittent starting of the feed mechanism. The web of sheet material 33 is fed in predetermined measured increments from the supply roll 34 across plate 201 through the alignment means 196 and the measuring and control means 198 by the spaced band saw members 259, 260 which move the selected amount of the web of material beneath the heater 324 and subsequently into the area between the mold and mandrel means. The relative position of the parts during the cycling of the device is shown in FIGS. 17–25, the starting position being as shown in FIG. 17. At this time the mold cavity 132 is in its lowermost position with the knock-out plug 156 in its uppermost position and the upper clamp means 182 remaining substantially in the same position throughout the cycle. The top and bottom cam shafts 86–78 rotate to cause the relative movements of the parts. (It should be noted at this juncture that the semidiagrammatic view 17 through 24 show both of the cam shafts 86–78 operating in a clockwise direction; in point of fact, when the machine is operating, one of the cam shafts is operating in a clockwise direction and the other is operating in a counterclockwise direction as shown in FIG. 5.) As the cam shafts rotate approximately 120° to the position shown in FIG. 18, it will be noted that the upper clamp means 182 and lower clamp means 96 now firmly engage the web 33 of material, the lower clamp means 96 having been moved almost immediately from its spaced position to the web engaging position shown in FIG. 18 by cam 126. The quick clamping of the material early in the cycle by the clamp means 96–182 is important to high speed operation. The mold cavity 132 has started its upward movement towards its uppermost extended position and the mandrel 166 has moved downwardly to a position of contact with the web 33 of plastic material. Chilling of the web in the portions contacted by the clamp means 96, 182 accurately determines the area of material to be drawn by each mandrel. As the upper and lower cam shafts 86, 78 continue to rotate, each upper mandrel member 166 moves to the position shown in FIG. 19, being extended to its greatest extent and thereby completing the substantial portion of the mechanical draw of the material 33 relative to the clamping engagement of the upper and lower clamping means 182, 96. The mold 132 continues to move upwardly causing slightly more mechanical drawing of the material 33, the mold continuing upwardly until it reaches the position shown in FIG. 20 at which point the annulus 188 surrounding the mandrel and the mold serve to trap and clamp the material between mold lip 160 by the shoulder 162 and the leading edge 190 of annulus 188 as shown in enlarged detailed section in FIG. 21.

Air under pressure (shown diagrammatically by arrows in FIG. 22) is then admitted from the mandrel side of the web forcing the web 33 of material to leave engagement with such features of the mandrel 166 as it contacts and to move into contact with the cooled walls of the mold cavity 131. The mold cavity cools the material 33 and causes it to set almost instantaneously. The cam shafts 86, 78 then continue to rotate, and as shown in FIGS. 23 and 25, the top cam 175 causes the mandrel annulus 188 to move down slightly so that the leading edge 190 of the annulus 188 shears the material against the shoulder 162 surrounding the mold lip 160. This causes the formed container 32 to be severed from the remaining portions of the web which are now scrap material. The parts then return to the position shown in FIG. 24 (which is identical with the position shown in FIG. 17) so that container 32 sits on the knockout plug 156 whereafter the ejection means 50, in the form of an air pressure nozzle, blows the finished container towards a suitable chute (not shown) for a controlled gathering of the formed items for subsequent packaging thereof.

The construction of the machine 30 is such that the entire cycle requires a matter of only a few seconds, for such a high speed operation, extremely fast responding and accurate feed means is provided. It will be noted that the feeding mechanism must not only respond very rapidly and accurately, but must be exceedingly rugged so that it can feed the required amount of material in the short time interval permitted in fast cycling. The next increment of material must be moved into position while the machine is between the position shown in FIG. 23 and a position intermediate the positions shown in FIGS. 17 and 18.

It is important to note that as the machine is started up after a prolonged shut down, it is not unusual to have at first a large jam-up of material in the vicinity of molds and mandrels. This occurs because the machine is designed to be operative at such a high production speed that it appears to take a few minutes to get all parts coordinated to run the machine smoothly. When this jam-up of material occurs, it is not unusual to get five, six or seven thicknesses of material in the vicinity of the mold and mandrel. In machines not having the deflecting shaft mechanisms such as 78, 86 shown and described hereinbefore, something would have to give way, the most likely parts being molds or the mandrels which are very expensive. However, in the instant machinery, due to the resilience and/or deflection of the shafts 78, 86 and due to the bearing structure and all of the associated mechanism, the jam-ups are accommodated and none of the machine parts are subjected to breakage. Also, in the instant machine, the deflection of the shafts 78, 86 and the design described allows an effect similar to a type of a resilient back pressure to provide a smooth type of operation which eliminates much of the pounding associated with most ram-types of molding machines known heretofore.

Although a specific embodiment has been shown and described, it is with full awareness that many modifications thereof are possible. The invention, therefore, is not to be restricted except insofar as is necessitated by the prior art and by the spirit of the appended claims.

What is claimed as the invention is:

1. Apparatus for feeding a web of material into a machine comprising, first and second aligned spaced track means each provided with an overhanging portion having a smooth surface, roller means mounted on said track means in spaced relation to said smooth surfaces, an endless toothed member supported by said roller means on each track means and being resiliently biased against a corresponding smooth surface to urge the teeth thereof against the web of material, means including adjustable stop means fixed to each of said track means for adjusting each roller means and the endless toothed member supported thereby to regulate the amount of tooth engagement with said web of material, and means for driving each endless toothed member to advance said web.

2. The apparatus set forth in claim 1 wherein spaced guide blocks are mounted adjacent said roller means to maintain said endless toothed members in position on said roller means.

3. The apparatus set forth in claim 1 wherein the drive means comprises a rotatably driven wheel member having an annular member mounted thereon, means intermediate said wheel member and said annular member affording a frictional clutch engagement therebetween, said endless toothed member being in the form of a band member driven by said annular member.

4. The apparatus set forth in claim 1 wherein the track means are mounted on frame means for adjustable movement toward and away from each other to adjust to various widths of web material.

References Cited by the Examiner

UNITED STATES PATENTS

| | | | |
|---|---|---|---|
| 1,446,294 | 2/1923 | Healey | 74—244 |
| 1,904,068 | 4/1933 | Meacock | 74—244 X |
| 2,701,971 | 2/1955 | Carter et al. | 74—230.7 |
| 2,804,968 | 9/1957 | Elliott et al. | 226—185 |
| 2,961,137 | 11/1960 | Menkel | 226—53 |
| 3,045,886 | 7/1962 | Francis et al. | 226—172 |

ROBERT B. REEVES, *Primary Examiner.*

RAPHAEL M. LUPO, *Examiner.*

A. T. McKEON, *Assistant Examiner.*